(12) United States Patent
McAvey (10) Patent No.: US 9,914,633 B2
(45) Date of Patent: Mar. 13, 2018

(54) FUEL TRANSFER SYSTEM

(71) Applicant: McAvey Enterprises LLC, Ridgewood, NJ (US)

(72) Inventor: Michael McAvey, Ridgewood, NJ (US)

(73) Assignee: MCAVEY VENTURES LLC, Ridgewood, NJ (US)

( * ) Notice: Subject to any disclaimer, the term of this patent is extended or adjusted under 35 U.S.C. 154(b) by 572 days.

(21) Appl. No.: 14/188,096

(22) Filed: Feb. 24, 2014

(65) Prior Publication Data

US 2014/0290787 A1 Oct. 2, 2014

Related U.S. Application Data

(63) Continuation-in-part of application No. 13/702,735, filed as application No. PCT/US2011/039385 on Jun. 7, 2011, now Pat. No. 8,695,645.

(60) Provisional application No. 61/352,023, filed on Jun. 7, 2010.

(51) Int. Cl.
    *B67D 7/04* (2010.01)
    *B65D 47/26* (2006.01)
    *B60K 15/01* (2006.01)
    *B60K 15/03* (2006.01)

(52) U.S. Cl.
    CPC ............... *B67D 7/04* (2013.01); *B60K 15/01* (2013.01); *B65D 47/26* (2013.01); *B60K 2015/03026* (2013.01)

(58) Field of Classification Search
    CPC ............ B67D 7/04; B67D 7/38; B60K 15/00
    USPC ........ 141/382, 383, 387–389, 301–302, 231, 141/59, 67; 137/355.16, 573, 614.04, 137/351; 222/318, 608
    See application file for complete search history.

(56) References Cited

U.S. PATENT DOCUMENTS

| 3,603,481 A | 9/1971 | Dilger et al. |
| 4,197,883 A | 4/1980 | Mayer |
| 4,311,261 A | 1/1982 | Anderson et al. |
| 5,135,258 A | 8/1992 | Buxton |
| 5,267,670 A | 12/1993 | Foster |

(Continued)

FOREIGN PATENT DOCUMENTS

WO   WO2009/073710 A1   12/2008

OTHER PUBLICATIONS

Swagelok Company, "Quick-Connects", Feb. 2015, pp. 1-20.*

*Primary Examiner* — Timothy L Maust
*Assistant Examiner* — Timothy P Kelly
(74) *Attorney, Agent, or Firm* — Brinks Gilson & Lione (57) ABSTRACT

A fuel transfer system for use with a motor vehicle includes a stationary module configured for permanent installation in the motor vehicle and a portable module configured for a detachable connection to the stationary module. The stationary module has a fuel fitting arranged in fluid communication with the fuel line between the fuel sending unit and the engine, a first fuel conduit connected to the fuel fitting and to a first transfer connector. A first normally closed valve is arranged in the first transfer connector. The first transfer connector is configured to be secured to a motor vehicle, for example next to a fill neck behind a filler door of the vehicle. The portable module has a second fuel conduit having a second transfer connector on one of two ends and a fueling nozzle connected to the other one of the two ends of the second fuel conduit.

16 Claims, 10 Drawing Sheets

(56) References Cited

U.S. PATENT DOCUMENTS

| | | | |
|---|---|---|---|
| 5,694,988 A * | 12/1997 | Collins | F02M 25/089 |
| | | | 141/290 |
| 5,718,260 A * | 2/1998 | Leonardi | B67D 7/04 |
| | | | 137/355.16 |
| 6,056,168 A | 5/2000 | Owen, Jr. | |
| 6,283,320 B1 | 9/2001 | Patch | |
| 6,792,966 B2 | 9/2004 | Harvey | |
| 7,255,190 B1 | 8/2007 | Floro | |
| 2004/0221920 A1 | 11/2004 | Ferguson et al. | |
| 2010/0101659 A1* | 4/2010 | Trattner | B67D 7/04 |
| | | | 137/87.03 |
| 2013/0139917 A1 | 6/2013 | McAvey | |
| 2014/0238539 A1* | 8/2014 | Paolucci | B60K 15/00 |
| | | | 141/94 |

* cited by examiner

FUEL TRANSFER SYSTEM

CROSS-REFERENCE TO RELATED APPLICATIONS

This application is a Continuation-in-Part of U.S. application Ser. No. 13/702,735, filed on Dec. 7, 2012, which is the National Phase of International Patent Application PCT/US11/39385, filed on Jun. 7, 2011, which claims priority to Provisional U.S. Patent Application 61/352,023, filed on Jun. 7, 2010, the content of all of which is herewith included by reference in its entirety.

FIELD OF THE INVENTION

This disclosure relates generally to a system and method for transferring fuel from a vehicle's fuel tank to a receiving reservoir, including a storage tank, a gasoline canister, or a fuel tank associated with a second vehicle or another type of motorized equipment.

BACKGROUND OF THE INVENTION

Vehicles, machines, and equipment powered by combustion engines find wide use in a variety of applications. Examples of such vehicles, machines, and equipment include snow blowers, riding tractors, off-road vehicles, electrical generators, motorcycles, snowmobiles, landscaping equipment, and lawn mowers, among others. There continually exists a need to be able to fill the fuel tanks of these vehicles, machines, and equipment in a safe and environmentally friendly manner. Many times it is necessary to transfer fuel to these vehicles, machines, and equipment when they require fueling at a location that is a substantial distance from a fueling station. This filling operation is conventionally accomplished by either transporting the vehicle, machine, or equipment to the fueling station or by bringing a heavy portable container of gas from the fueling station to the vehicle, machine, or equipment. Both of these options suffer from multiple drawbacks. First, transporting a vehicle, machine, or piece of equipment to a fueling station can be time consuming and costly. Second, transporting a portable fuel container from the fueling station to the vehicle, machine, or equipment is ergonomically difficult for the operator, as well as being both environmentally unfriendly due to the possibility that a spillage or accident could occur and a health hazard due to the dangers associated with siphoning.

There is a continuing need or desire to provide an improved method or system to transfer fuel to external tanks or to vehicles, machines, and equipment that have run out of fuel during use or operation.

SUMMARY

The present disclosure provides a fuel transfer system for use with a motor vehicle having liquid fuel-fed engine, a fuel tank and a fuel sending unit for pumping fuel from the fuel tank thorough a fuel line to the engine According to a first aspect, the fuel transfer system includes a stationary module (or subassembly) configured for permanent installation in the motor vehicle, the stationary module having a fuel fitting arranged in fluid communication with the fuel line between the fuel sending unit and the engine, a first fuel conduit connected to the fuel fitting and providing a fluid path to a first transfer connector attached to the first fuel conduit; and a first normally closed valve in the first transfer connector; wherein the first transfer connector is configured to extend through and to be secured to a component of a motor vehicle for example through a hole in a metal sheet body component, or through a different panel or bracket. For example, such a hole may be formed behind the fuel fill door of the vehicle next to the fuel filler neck so that the first transfer connector remains hidden behind the fill door during normal operation of the vehicle.

According to another aspect, the fuel transfer system further includes a portable module (or subassembly) configured for a detachable connection to the stationary module, the portable module including a second fuel conduit having a second transfer connector on one of two ends, the second transfer connector mating with the first transfer connector and configured to be releasably connected to the first transfer connector for establishing a fluid connection between the stationary module and the portable module. The portable module further includes a fueling nozzle connected to the other one of the two ends of the second fuel conduit, the fueling nozzle being configured for delivering the fuel flowing from the fuel fitting through the first and second fuel conduits to the auxiliary fuel vessel; a second normally closed valve in the second transfer connector; and a third normally closed valve incorporated in the fueling nozzle for controlling delivery of the fuel through the fueling nozzle when the system is operated for delivering fuel to the auxiliary fuel vessel.

Further details and advantages become apparent from the following description of various embodiments shown in the accompanying drawings.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, a fuel transfer system made and used according to the teachings contained herein is described throughout the present disclosure in one embodiment in conjunction with a motorcycle for use either on a road or off-road in order to more fully illustrate the system and method of use. The incorporation and use of such a fuel transfer system in conjunction with other types of sport/recreational vehicles used either on a road or off-road, including but not limited to, all-terrain vehicles (ATVs), snowmobiles, personal watercraft, dune buggies, sandrails, dirt bikes, mopeds, motorized scooters, tractors, and golf carts, among others, is contemplated to be within the scope of the disclosure. It should be understood that throughout the description and drawings, corresponding reference numerals indicate like or corresponding parts and features.

One embodiment of the present invention generally provides a fuel transfer system for use with an off-road or on-road sport/recreational vehicle of the type having a fuel tank and a fuel sending unit, such as a fuel pump, for pumping fuel through a fuel line to the vehicle's engine when the engine is running. The fuel transfer system allows fuel in the fuel tank or fuel line of the vehicle to be delivered to an auxiliary fuel vessel, such as the fuel tank of another vehicle, a fuel container, or an engine powered machine. When the engine of the vehicle is running (e.g., idling, etc.) or the fuel pump is running due to any other means, the control of fuel is partially diverted from the fuel line to the fuel transfer system in such a manner that will not cause the engine to starve, stall, or stop running. Preferably, the engine of the off-road or sport/recreational vehicle utilizes fuel injection technology.

Figures 1A, 1B, 1C:
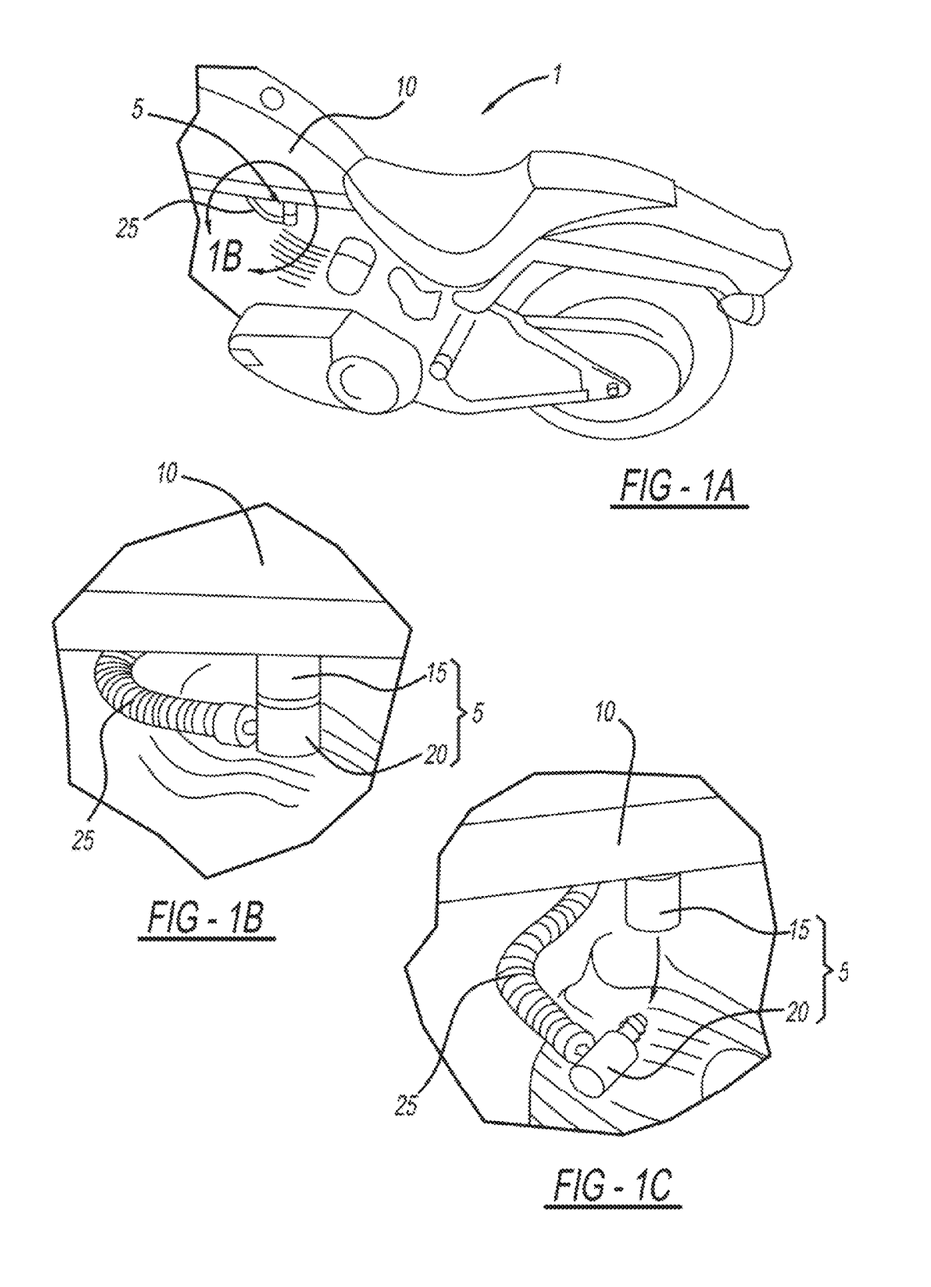
FIG. 1A is perspective view of a motorcycle highlighting a conventional fuel line fitting coupled to the motorcycle's fuel tank and a fuel line.
FIG. 1B is a perspective view of the conventional fuel line fitting from FIG. 1A.
FIG. 1C is another perspective view of the conventional fuel line fitting from FIG. 1A highlighting the use of a quick disconnect coupling.

Referring to FIGS. 1A and 1B, a motorcycle 1 is shown in which a conventional fuel connector 5 couples the motorcycle's fuel tank 10 to a fuel line 25 in order to supply fuel to the motorcycle's engine. The conventional fuel connector 5 typically includes a quick disconnect fitting that includes both a female component 15 (e.g., first component) and a male component 20 (e.g., second component) that couple together to provide a leak-free connection. The female component 15 and male component 20, when connected, define a channel or flow path that connects the motorcycle's fuel tank 10 to a fuel line 25 that feeds the engine. One skilled-in-the-art will understand that a motorcycle may be manufactured with a conventional fuel connector 5 as standard equipment or a conventional fuel connector 5 can be inserted between the fuel tank and the fuel line as an aftermarket retrofit.

Referring now to FIG. 1C, when the female component 15 and the male component 20 are disconnected from one another, the female component 15 and the male component 20 remain coupled to the fuel tank 10 and the fuel line 25, respectively. The female connector 15 and male connector 20 are typically designed such that the flow of fluid through the connector is stopped or halted when the connectors are not coupled together through the use of internal normally closed valves. The ability to separate the fuel line 25 and male connector 20 from the fuel tank 10 and the female connector 15 allows for the quick, in-field installation and use of the fuel transfer system of the present disclosure. One skilled in the art will understand that although the location of the male and female components with respect to the fuel tank and the fuel line can be reversed without exceeding the scope of this disclosure.

Figure 2:
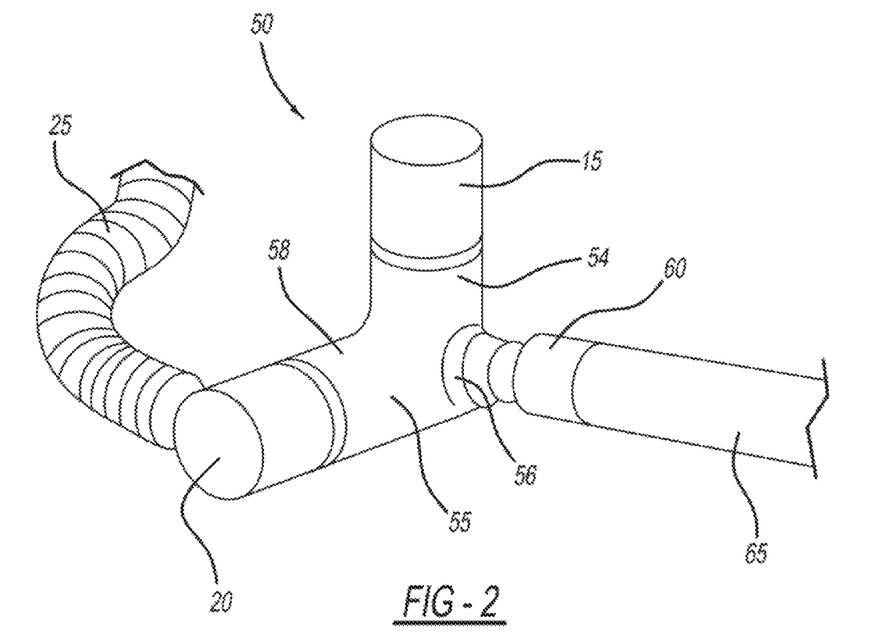
FIG. 2 is a perspective view of a fuel transfer fitting constructed according to the teachings of the present disclosure.
Figure 3A:
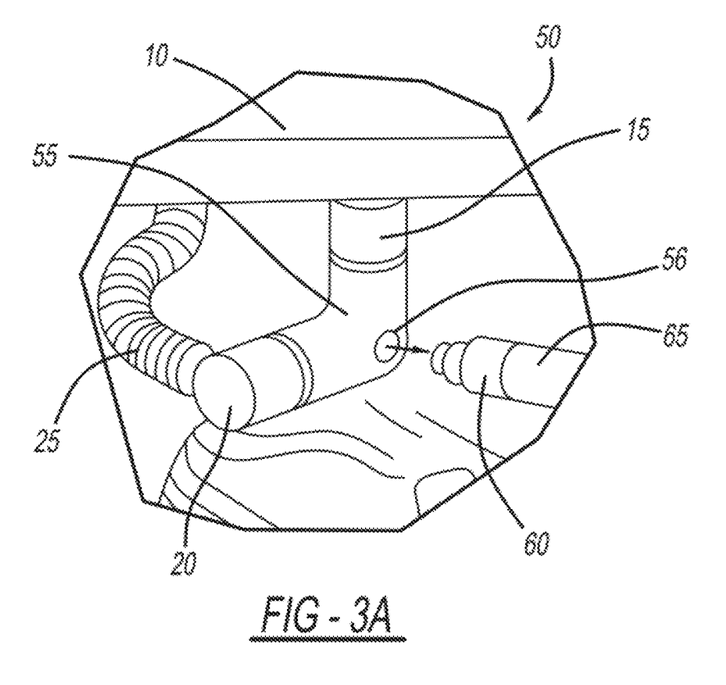
FIG. 3A is a perspective view of the fuel line fitting of FIG. 2 highlighting the use of a quick disconnect coupling to a conduit used in the fuel transfer system according to one aspect of the present disclosure.

Referring now to FIGS. 2, and 3A, a fuel transfer system 50 is shown to include a fuel transfer fitting 55 made according to one aspect of the present disclosure. The fuel transfer system 50 is an easy to install system that allows the end-user to transfer liquid fuel (e.g., gasoline, E85, E95, diesel fuel, or other fuel) directly from the host off-road or sport/recreational vehicle's fuel tank 10 to the fuel tank (not shown) of a second vehicle or auxiliary equipment, as well as to a portable fuel container if desired. In this system 50, a fuel transfer fitting 55 may be inserted into the fuel line 25 using a connector or coupling that is compatible with the existing fuel line 25.

The fuel transfer fitting 55 is designed such that one end (first connector point) 54 connects to the female component 15 of the conventional fuel line fitting 5, while the other end (second connector point) 58 of the transfer fitting 55 couples to the male component 20 of the conventional fitting 5. The fuel transfer fitting 55 may be any desired shape, including L-shaped (shown in FIGS. 2 and 3A), Y-shaped, T-shaped, or shaped in a straight line, to name a few. The fuel transfer fitting 55 includes a third connection point 56, which may include another female component for use in a quick disconnect fitting arrangement, or may be permanently attached. The third connector point 56 (e.g., female component) may be coupled to a male connector 60 located at the end of a conduit 65 used as part of the fuel transfer system 50. The fuel transfer fitting 55 is designed such that a channel is formed through which fuel can flow when the vehicle's fuel pump is running. Thus the fuel transfer fitting 55 is capable of interacting with the conventional fuel line fitting 5 in such a way as to open a passageway through which fuel can flow when necessary or desired for use in the fuel transfer system 50.

Still referring to FIGS. 2 and 3A, the connection between the third connection point 56 (e.g., female component) and the male connector 60 may be accomplished by quick disconnect fittings, including various arrangements, such as double poppet valves or a stem valve and sleeve arrangement, to name a few. In addition, one end of the male connector 60 is coupled to the conduit 65 through the use of any means of connection known to one skilled-in-the-art, including but not limited to a threaded connector, among others.

Figure 3B:
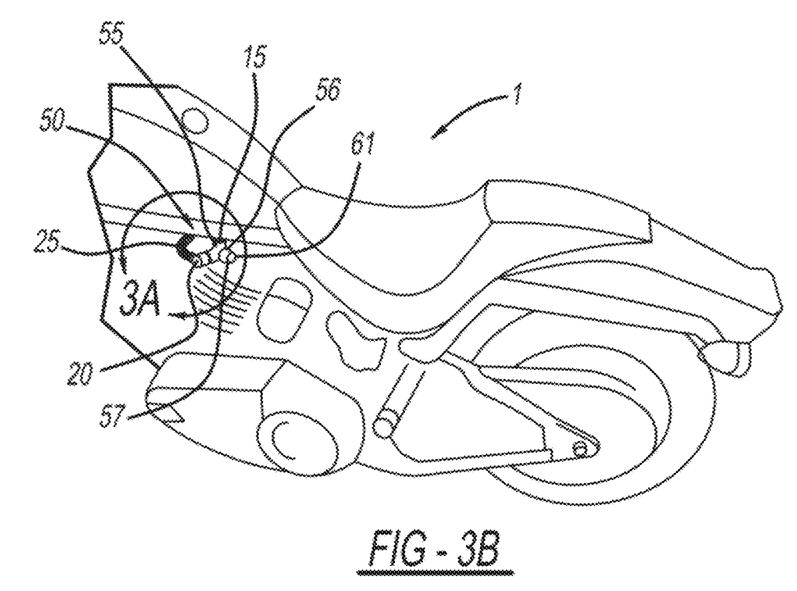
FIG. 3B is a perspective view of a motorcycle highlighting the use of the fuel line fitting of FIG. 3A.

Referring now to FIG. 3B, according to another aspect of the present disclosure, one skilled-in-the-art will understand that the third connection point 56 of the fuel transfer fitting 55 may also include a threaded connector to which an on-off valve 57, such as a ball valve, a check valve, a butterfly valve, or a gate valve, among others, may be coupled. The on-off valve 57 may further comprise a connector 61 that is adapted to mate with the connector 60 of the conduit 65. Such a connector 61 may be a female component of a quick disconnect fitting, a threaded connector, or the like. A variable control valve may be inserted into the communication path in line with the on-off valve 57. The variable control valve may be incorporated in the connection point 56 or anywhere in the connector 61 or conduit 65. The variable control valve can be adjusted to a vehicle-specific flow rate that limits the flow of fluid through the connector 60 to a rate that will allow enough fuel to be fed to the engine through the fuel line 25 to keep the engine running.

Figure 4A:
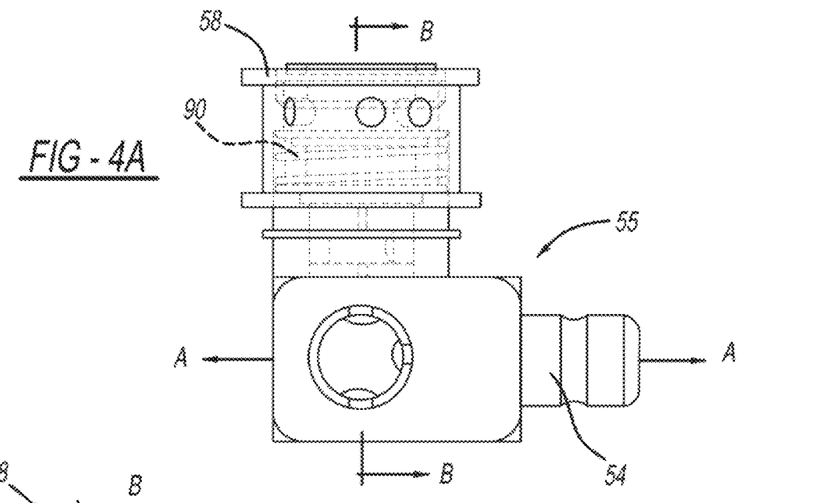
FIG. 4A is another perspective view of a fuel transfer fitting constructed according to the teachings of the present disclosure.
Figures 4B, 4C:
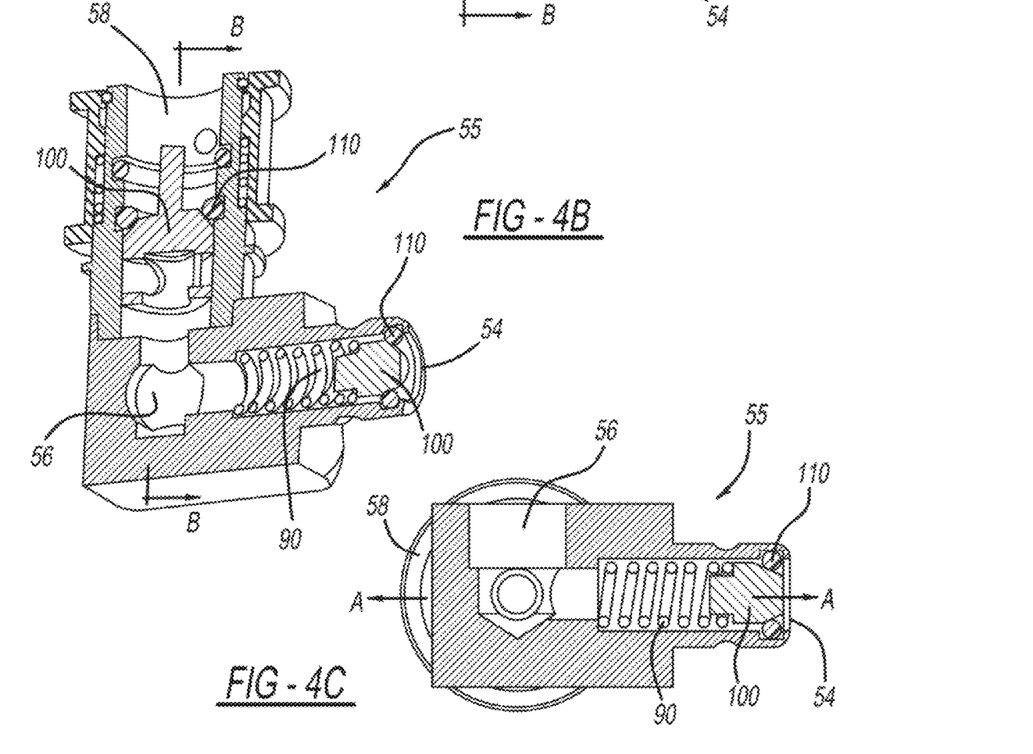
FIG. 4B is a cross-sectional view of the fuel transfer fitting of FIG. 4A taken along axis B-B.
FIG. 4C is a cross-sectional view of the fuel transfer fitting of FIG. 4A taken along axis A-A.

Referring now to FIGS. 4A, 4B, and 4C, the transfer fitting 55 according to one aspect of the present disclosure is shown in which the first connector point 54 is a male quick disconnect fitting, the second connector point 58 is a female quick disconnect fitting, and the third connector point 56 is a female quick disconnect fitting. A female and male quick disconnect fitting are designed to mate with one another to form a quick disconnect coupling. Each of the fittings may contain a valve which is held open when the fittings are coupled together, thereby allowing fuel to flow through the coupling. When the fittings are disconnected, a spring 90 in the fitting closes the valve by allowing a stem 100 to seal against an annular seat 110, thereby stopping the flow of fuel through the fitting. Notably, however, one of female component 15 and male component 20 does not require a valve for proper operation of the transfer system if that component is connected to the vehicle first. Especially, the second connector establishing a fluid communication with the fuel line 25 may include only a stem to open the valve in the male component 20 if precautions are taken that the second connector is attached to the male component before the first connector 56 is attached to the female component. One skilled in the art will understand that although each of the connector points 54, 56, 58 is illustrated in the Figures as being a quick disconnect fitting, other types of fittings may be used without exceeding the scope of the present disclosure.

Figure 5A:
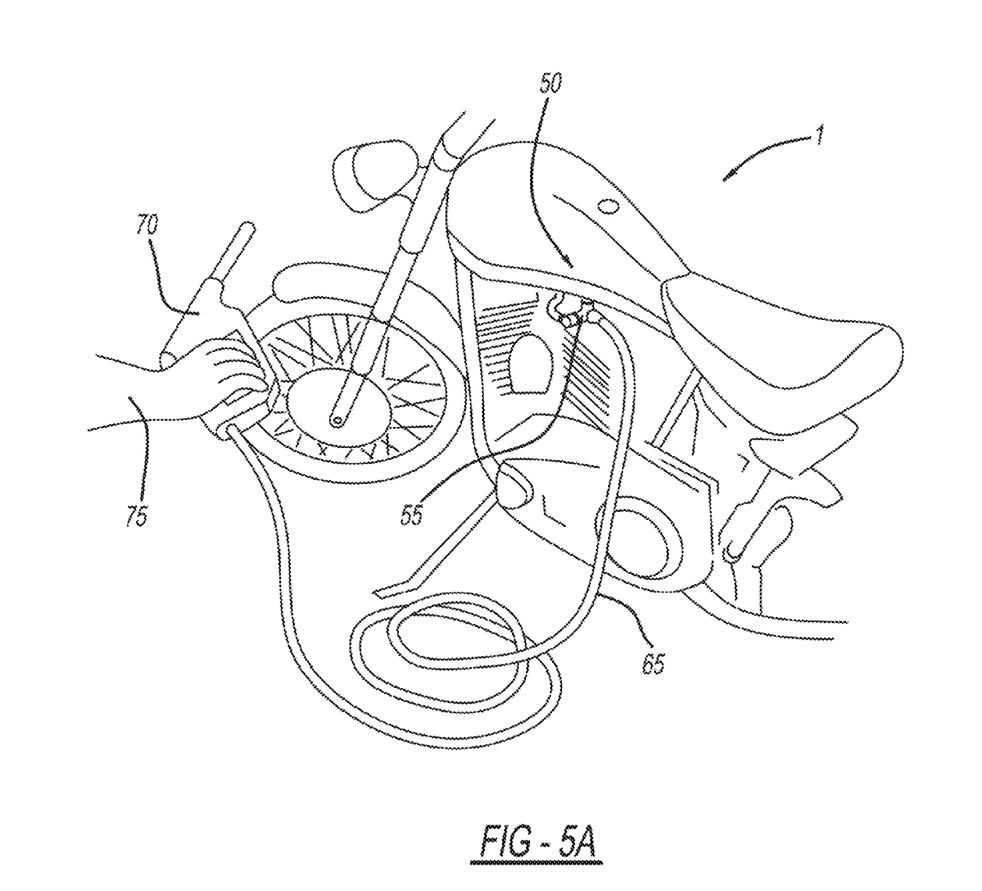
FIG. 5A is a perspective view of a motorcycle using the fuel line fitting of FIG. 3A as part of a fuel transfer system according to another aspect of the present disclosure.

Referring now to FIG. 5A, the fuel transfer system 50 according to one aspect of the present disclosure includes a fueling nozzle 70, a fuel transfer fitting 55, and a flexible fuel conduit 65 that may when desired be optionally partially electrically connected and grounded to the vehicle. This can be accomplished according to one aspect of the present disclosure by having all of the components made out of a conductive material, such as a metal. The flexible, second fuel conduit 65 may be inherently conductive when it is selected as one from the group of a conductive material (e.g., metal or conductive polymer, among others), a non-conductive material reinforced with conductive fillers, or a non-conductive material having a separate conductive element running the length of the conduit 65. The separate conductive element may be a conductive mesh of fibers or wires embedded within second fuel conduit 65. The flexible fuel conduit 65 may be formed of multiple layers of different materials with the conductive element being located at the interface between two adjacent layers if desirable. One skilled-in-the-art will understand that the conductive element may also include a separate wire running the length of the second fuel conduit 65 and coupled thereto by any means known, including but not limited to clamps (e.g., band clamps, etc.) and clips (e.g. alligator clips, etc.).

Optionally, a grounding cable or connector (not shown), such as an alligator type clip, may be attached to the fueling nozzle 70 and capable of engaging another grounded element, such as the off-road or sport/utility vehicle, or the second vehicle, auxiliary equipment, or portable fuel container, thereby assisting in making the entire fuel transfer system 50 electrically common or grounded. The use of a grounding cable or connector becomes more important if an operator 75 uses a conventional hose (e.g., garden hose, etc.) to connect the nozzle 70 to the fuel transfer fitting 55. According to one aspect of the present disclosure the fuel transfer system is optionally partially electrically grounded.

The fuel transfer system 50 according to another aspect of the present disclosure may also include a flow/pressure regulator (not shown) or any other means known to one skilled-in-the-art to assist in ensuring that the transfer of fuel from the fuel line 25 through the conduit 65 does not starve or stall the engine during use. The use of such a regulator may be desirable when the fuel transfer system 50 is used with an off-road or sport/recreational vehicle that does not utilize fuel injection technology. Alternatively, the flow capacity of the system may inherently provide sufficient restrictions on the fuel flow through conduit 65 without a discrete regulator element, for example by selection of the diameter of the conduits and the flow characteristics of the various fittings and valves.

Figure 5B:
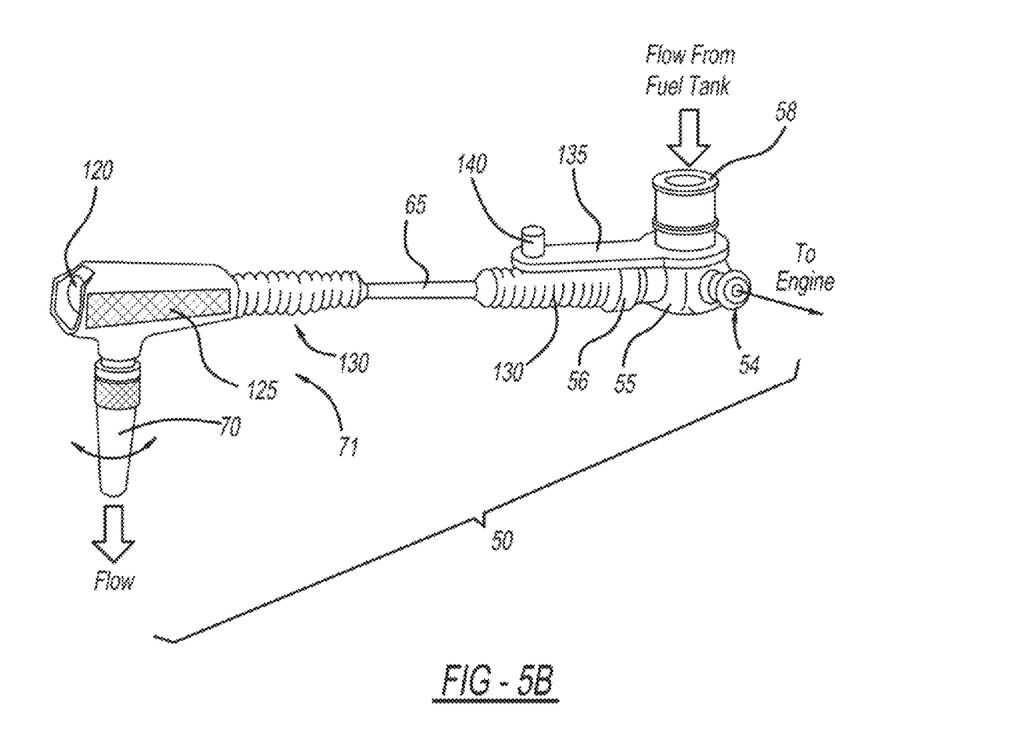
FIG. 5B is another perspective view of a fuel transfer system according to another aspect of the present disclosure.

Referring now to FIG. 5B, the fuel transfer system 50 according to one aspect of the present disclosure includes a transfer fitting 55 having a first connector point 54, a second connector point 58, and a third connector point 56. The third connector point 56 is coupled to one end of a flexible conduit 65. The other end of the flexible conduit 65 is coupled to a nozzle assembly 71 that includes a nozzle 70 and a push button operated actuator 120 incorporated into a housing 125 that also serves as a handle for operation off the fuel transfer system 50. Optionally, each end of the conduit 65 may also include strain relief jackets 130 encompassing the connections between the conduit 65 and the nozzle assembly 71 or third connector point 56.

Still referring to FIG. 5B, the fuel transfer system 50 may also include a pressure release tool 135 that is sized and adapted to be inserted into one of the first or second connector points 54, 58 after the fuel transfer system 50 has been used to transfer fuel from the fuel tank of a motorcycle to a second vehicle or other reservoir. The pressure release tool 135 is preferably bendable and includes a post 140 that can be used to open the valve in at least one of the first or second connectors 54, 58, thereby reducing the pressure in the fuel transfer system 50 and allowing venting of the system to atmosphere to promote drainage desired when the user is done using the system. When the pressure release tool 135 engages the first or second connector point 54, 56 in the fitting 55, the fuel in the conduit 65 and fitting 55 can be drained by gravity through the nozzle 70.

Figures 6A, 6B:
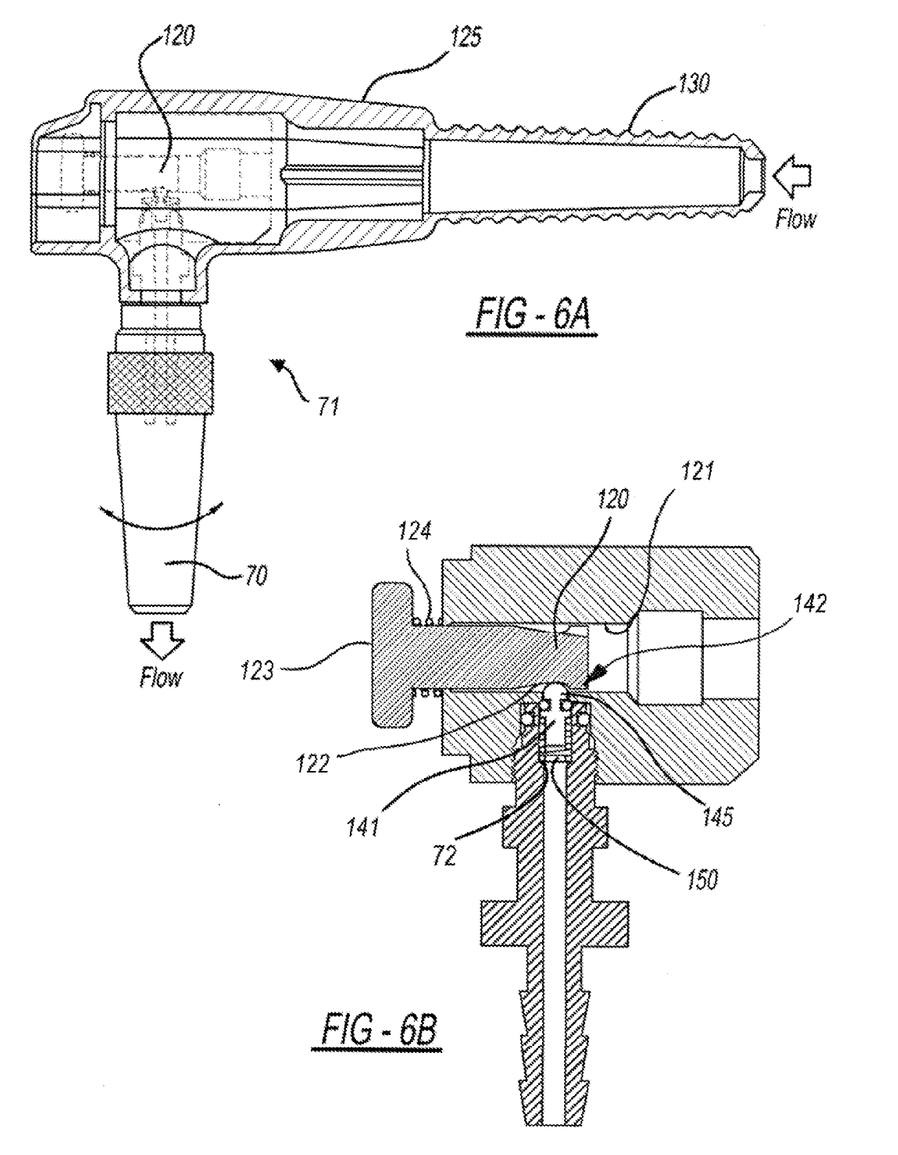
FIG. 6A is a cross-sectional view of the nozzle assembly of the fuel transfer system according to another aspect of the present disclosure.
FIG. 6B is a cross-sectional view of the nozzle in the nozzle assembly of FIG. 6A.

Referring now to FIGS. 5B, 6A and 6B, the nozzle assembly 71 includes a nozzle 70. The nozzle assembly 71 may include an on-off valve for controlling the fuel flow through the nozzle 70. Alternatively, the nozzle 70 may be adjustable in order to increase or decrease the flow of fuel through the nozzle 70. Turning the nozzle 70 fully in one direction will open the nozzle 70 completely, while turning the nozzle 70 fully in the other direction will cause the nozzle 70 to stop the flow of fuel. The nozzle 70 includes a valve 142 having a valve member 141, a valve seat 145, and a spring 150. The valve of the nozzle 70 is in communication with the actuator 120. Pushing the actuator 120 causes the valve in the nozzle 70 to open, thereby allowing fuel to flow through the nozzle 70. Turning the nozzle 70 fully to its closed position can prevent the actuator 120 from opening the valve in the nozzle 70.

For example, the actuator 120 may be guided in a bore 121 arranged perpendicular to the direction of movement of the valve member 141 inside the housing 125. The actuator 120 may include a sloped groove 122 on its circumference that decreases in depth toward the location of the pushbutton 123. The actuator 120 may further be biased toward the pushbutton 123 by an actuator spring 124.

In FIG. 6B, the actuator 120 and the valve member 141 are shown in a basic state without any interaction from an operator. The valve member 141 is biased toward the actuator so that it protrudes into the bore 121 and rests against the actuator 120 at or near the greatest depth of the groove 122. As the pushbutton 123 is pressed and the actuator 120 is moved into the bore 121, the groove 122 moves over the valve member 141. As the valve member slides across the groove 122, the sloped profile of the groove 122 acts like a ramp, thereby displacing the valve member 141 radially away from the actuator and away from the valve seat 145. This movement opens the nozzle 70. Turning the throttle 70 changes the distance of an abutment 72 of the spring 150 from the valve seat 145. Because the travel of the valve member 141 from the valve seat 145 is limited by the distance, by which the spring 150 can be compressed, such movement of the valve member can be blocked entirely by screwing the nozzle all the way into the housing, which completely compresses the spring 150 without any possible travel of the valve member 141. If the valve member 141 is blocked in the shown basic position, the pushbutton cannot be moved by any significant distance because the slope of the groove 122 cannot pass the valve member 141.

Figure 7:
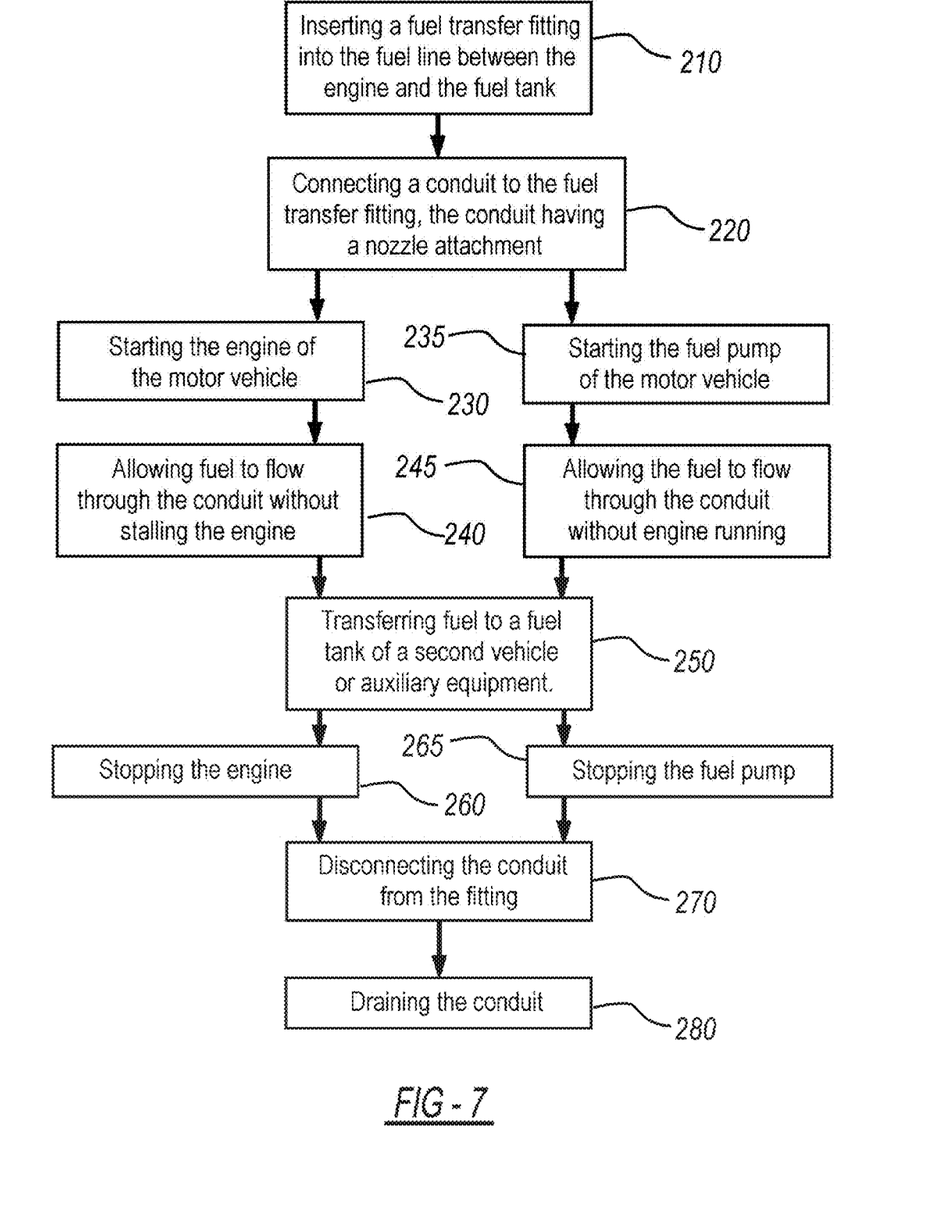
FIG. 7 is a schematic representation of a method of transferring fuel from an off-road or recreational/sport vehicle to a second vehicle, reservoir, or motorized equipment according to one embodiment of the present disclosure.

Referring to FIG. 7, a method 200 for transferring fuel from the fuel tank of an off-road or sport/recreational vehicle to the fuel tank of a second vehicle, the fuel tank of auxiliary equipment, or to another fuel reservoir is provided. The use of this method will allow, for example, the transfer of fuel from the off-road or sport/recreational vehicle to a second vehicle or auxiliary equipment that has run short of fuel or it can be used to simply empty the fuel tank of the off-road or sport/recreational vehicle in preparation of the vehicle being stored or transported. Such a method 200 generally includes multiple steps, the first of which is step 210 of inserting a fuel transfer fitting 55 as previously described into the fuel line between the engine and fuel tank of the vehicle. Such a fuel transfer fitting 55 may be inserted into the fuel line when the engine is turned off and the fuel line includes a conventional quick disconnect fitting 5. The fuel transfer fitting 55 may be inserted into the fuel line either during the manufacture of the vehicle or as an aftermarket retrofit.

The next step in the method 200 is step 220 of connecting a conduit to the fuel transfer fitting 55. The other end of the conduit has a nozzle attachment 70 through which the fuel will be dispensed into the fuel tank of the second vehicle or auxiliary equipment.

Subsequently, either step 230 or step 235 may be performed, depending on the fuel transfer system used. If the fuel pump of the vehicle is powered by the engine, the engine of the vehicle is started in step 230 so that fuel is pumped through the conduit at a rate that does not stall the engine in step 240. Alternatively, a separate switch for operating the fuel pump with battery power may be provided. In this case, step 235 involves starting the fuel pump of the motor vehicle. Fuel is then allowed to flow through the fuel line and the conduit in step 245 without the engine running. Step The next step 250 involves actually transferring the fuel to the fuel tank of a second vehicle, to a gasoline canister, to auxiliary equipment, or any other container.

Optionally, the method may further include separating a conventional fitting 5 into a first component 15 and a second component 20 in order to insert the fuel transfer fitting 55 into the fuel line 25. In this case, the first connector point 54 of the transfer fitting 55 can be coupled to the first component 15 and the second connector point 58 of the transfer fitting 55 can be coupled to the second component 20 in order to create a channel through which the fuel can flow. The nozzle 70 can be opened and adjusted to control the flow of fuel through the fuel transfer system 50. The operator 75 can begin transferring fuel through the fuel transfer system 50 by using the push button or lever 120 to open the valve in the nozzle 70.

After the transfer of fuel is complete, the operation of the fuel pump is stopped. Where the engine powers the fuel pump, the engine is turned off in step 260. If the fuel pump is powered from a battery, the fuel pump may be automatically stopped via a timer or after the flow of a specific volume, or manually via a switch in step 265. Subsequently, the conduit is disconnected from the fitting in step 270, and any remaining fluid may then be drained from the conduit into the container, into which the fuel was transferred. One possible manner of draining the conduit is described in connection with FIG. 9 below.

The method may also include the removal of the fuel transfer system 60 from the fuel line 25 and the reconnection of the first and second components 15, 20 to form the conventional fitting 5 (when present). Any fuel remaining in the fuel transfer system 50 can be removed by using the pressure release tool 135 to open the valve in one of the first and second connector points 54, 58 of the transfer fitting 55, followed by pushing the button or lever 120 to allow fuel to flow through the nozzle 70.

Figure 8:
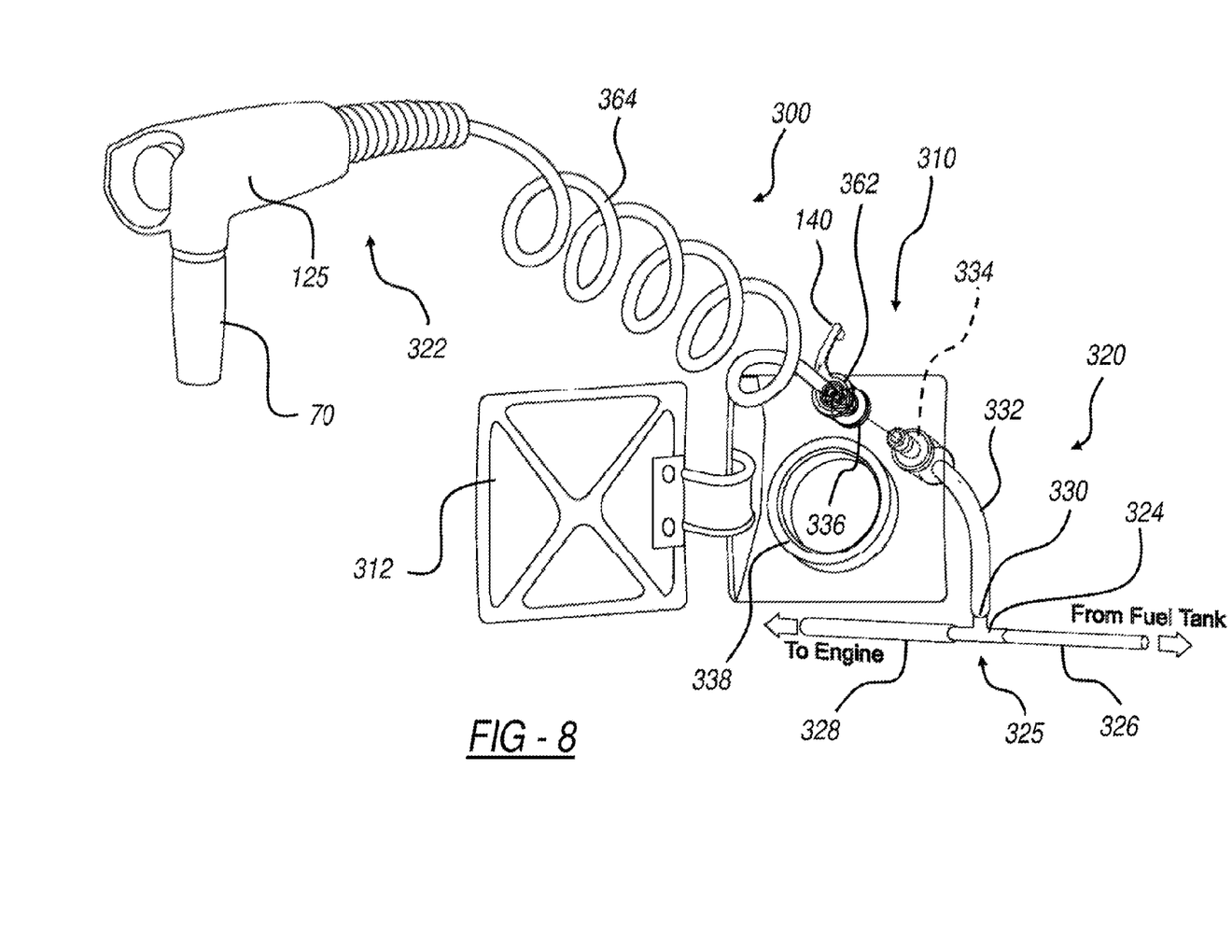
FIG. 8 is a perspective view of a further embodiment of a fuel transfer system especially adapted for use in connection with a passenger car or light truck type motor vehicle.
Figure 9:
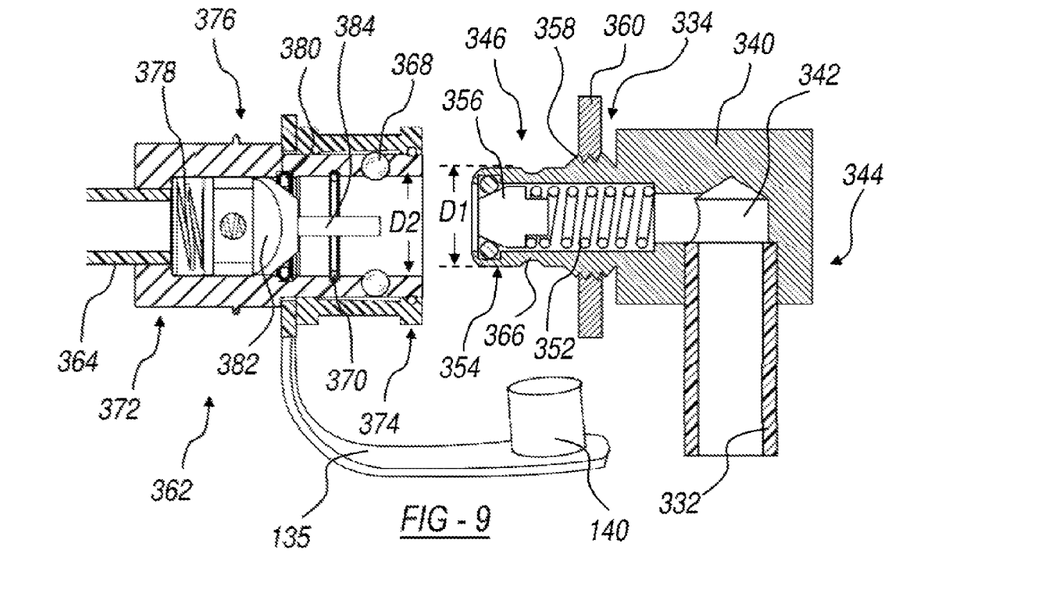
FIG. 9 is a cross-sectional view of a first and a second normally closed valve suited for implementation in the fuel transfer system of FIG. 8.
Figure 10:
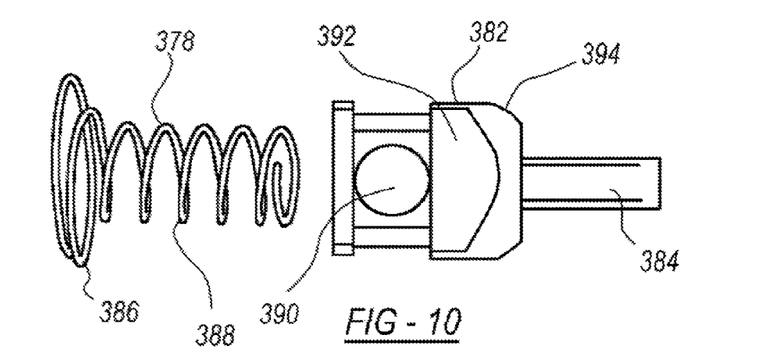
FIG. 10 shows a valve member and compression spring suited for one of the second normally closed valve of FIG. 9.

FIGS. 8 through 10 show an alternative fuel transfer system 300 that is suitable for insertion into any section of the fuel line of a vehicle. In particular, the embodiment of FIGS. 8 through 10 can be installed to provide a fuel transfer interface 310 that is protected from dirt, from views, and from fuel theft. In the embodiment shown, the fuel transfer system is placed behind a conventional, preferably lockable, fuel fill door 312 of a road vehicle, such as a passenger car or light truck. The fuel transfer system 300 of FIGS. 8 through 10 can be installed via an aftermarket modification of a road vehicle. The fuel transfer system 300 includes two modules consisting of one stationary module 320 and one portable module 322. The stationary module 320 is configured to be stationarily mounted in the vehicle, while the portable module 322 can be temporarily and detachably connected to the stationary module 320 for individual fuel transfer operations.

A vehicle (not shown in its entirety) has a fuel line 325 extending from the fuel tank of the vehicle to the engine of the vehicle. The fuel transfer system 300 includes a T-type fuel line fitting 324 configured to be inserted between two sections 326 and 328 of the fuel line 325 that have been cut apart. The fuel line fitting 324 provides a fluid communication between the two fuel line sections 326 and 328 and further provides a port 330 for a first fuel conduit 332. The first fuel conduit 332 provides a fluid path from the fuel line fitting 324 to a first transfer connector 334 attached to the first fuel conduit 332. The fuel line fitting 324, the first fuel conduit 332, and the first transfer connector 334 form the stationary module 320 of the fuel transfer system 300 shown in FIG. 8.

The first transfer connector 334 as shown is configured to be inserted through a hole 336 in a vehicle panel or bracket and to be secured to the panel. A suitable hole 336 may, for example, be provided in the sheet metal adjacent the filler neck 338 of the vehicle in an area that is concealed by the fuel fill door 312 when the fuel fill door 312 is closed.

Alternative arrangements may include an installation in a different location in or on the vehicle. Non-limiting examples for such locations are vehicle bumpers, truck beds, storage compartments, or the vehicle trunk.

In FIG. 8, the fuel fill door 312 is schematically shown opened to reveal the arrangement of the fuel transfer interface 310. The first transfer connector 334 is preferably smaller in diameter than the filler neck 338. In particular, the first transfer connector 334 preferably has an outside diameter less than half of the outside diameter of the filler neck 338. Thus, the diameter of the first transfer connector 334 is preferably no larger than about 1 inch, i.e. 2.5 cm.

In FIG. 9, a schematic cross-section of the first transfer connector 334 is shown on the right side of FIG. 9. The first transfer connector 334 has a main body 340 that accommodates an elbow 342 with an inside port 344 connected to the first fuel conduit 332 and outside port 346 configured for the attachment of the portable module 322 described below.

It should be noted that, while the main body 340 of the shown embodiment of the first transfer connector 334 describes a 90° elbow 342 by including two connected perpendicular bores, it may also include a straight bore so that the inside port 344 and the outside port 346 are located on opposite sides of the first transfer connector 334. The angled arrangement may be advantageous for packaging purposes inside the vehicle if limited space is available.

The outside port 346 includes a first normally closed valve 350. The first normally closed valve 350 includes a first compression spring 352, a first valve seat 354, and a first valve member 356. The first compression spring 352 biases the first valve member 356 toward the opening of the outside port 346 and toward the first valve seat 354. The first valve member 356 has a mushroom-like shape with the first compression spring 352 embracing the stem and abutting the rim of the mushroom-shaped valve member 356. The first valve seat 354 is formed by a first elastic ring inserted into a radial annular groove inside the first transfer connector 334 adjacent to the opening of the outside port 346. The first valve seat 354 thus retains the first valve member 356 and the first compression spring 352 inside the first transfer connector 334.

For securing the first transfer connector 334 to the vehicle panel or another body component, the embodiment shown in FIG. 9 carries a thread 358 and a nut 360. Other options for securing the first transfer connector 334 to a vehicle include snap rings, sweat soldering, crimping, and the like, depending on whether the attachment of the first transfer connector 334 is intended to be permanent or releasable.

In the embodiment shown, the first transfer connector 334 is a male quick connector part dimensioned to be fittingly inserted into a second transfer connector 362.

Referring to FIG. 8 again, the second transfer connector 362 is attached to a second fuel conduit 364. In the embodiment shown, the second fuel conduit 364 is formed by a coiled flexible hose. Coiled flexible hoses have the advantage of easy and compact storage. The second fuel conduit 364 is connected to a handle 125 doubling as a housing with an attached nozzle 70. The handle has an inner bore establishing a fluid connection from the second fuel conduit 364 to the nozzle 70. The second transfer connector 362, the second fuel conduit 364, and the handle-nozzle assembly form the portable module 322 of the fuel transfer system 300. The handle-nozzle assembly has been described in detail above in connection with FIG. 6B.

The second transfer connector 362 is depicted in FIG. 9 on the left side of FIG. 9. It is formed as a female quick connector part with an inner diameter D2 adapted to form a snap fit with the outer diameter D1 of the first transfer connector 334. The first transfer connector 334 has a radial annular groove 366 on its outer surface, and the second transfer connector 362 has a set of balls 368 inserted at its inner surface. The balls 368 snap into the groove 366, thus establishing the snap connection. Inward from the balls 368, the second transfer connector 362 carries an O-ring 370 on its inner surface at a location that is contacted by the end of the first transfer connector 334 upon insertion into the second transfer connector 362, thus forming a seal preventing leakage upon attachment of the first and second connectors 334 and 362 to each other.

The second transfer connector 362 is depicted as a straight connector with a conduit port 372 connected to the second fuel conduit 364 and a terminal port 374 for accommodating the first transfer connector 334. The terminal port 374 and the conduit port 372 are on opposite ends of the second transfer connector 362 and are in fluid communication through a straight, stepped bore. The terminal port 374 is closed by a second normally closed valve 376.

The second normally closed valve 376 includes a second compression spring 378, a second valve seat 380, and a second valve member 382. The second compression spring 378 biases the second valve member 382 toward the opening of the terminal port of the second transfer connector 362 and toward the second valve seat 380.

Like the first valve seat 354, the second valve seat 380 is formed by a second elastic ring inserted into a radial annular groove inside the second transfer connector 362 and retains the second valve member 382 and the second compression spring 378 inside the second transfer connector 362.

The second valve member 382 has a valve stem 384 protruding through the second valve seat 380. The valve stem 384 has a length dimensioned to abut the first valve member 356 when the first and second connectors 334 and 362 are in mating engagement. Further, the length of the valve stem 384 effects that the valve stem 384 holds the first and second valve members 356 and 382 at a distance from each other that is greater than the distance of the two valve members 356 and 382 while both the first and second valves are closed while the first and second connectors 334 and 362 are engaged. Thus, the valve stem 384 forces at least one of the first and second valve members 356 and 382 out of contact with the associated first or second valve seats 354 and 380.

Furthermore, the travel of the second valve member 382 away from the second valve seat 380 is limited by a radial step 386 in the bore forming an abutment for both the second compression spring 378 and the second valve member 382. The abutment limits the travel of the second valve member 382 to a stop position at a defined distance from the second valve seat 380. The length of the valve stem 384 is dimensioned to keep both of the first and second valve members 356 and 382 out of contact with the respective first and second valve seat 354 and 380 when the second valve member 382 is in the stop position.

The second compression spring 378 and the second valve member 382 are shown in more detail in FIG. 10. The second compression spring 378 is a helical spring with generally two axial portions of different diameters, i.e. a wider abutment portion 386 and a narrower insertion portion

388. The abutment portion 386 is axially shorter than the insertion portion 388. The abutment portion 386 is adapted for resting on the radial step 384 in the bore. The insertion portion 388 is sized to fit inside a perforated cavity 390 inside the second valve member 382. The second valve member 382 has an axial section 392 with flattened lateral sides for enhancing the passage of fluid adjacent a further axial section 394 shaped like a truncated cone. The truncated cone cooperates with the second valve seat 380.

The method shown in FIG. 7 applies in analogy to fuel transfer system 300. When applied to the fuel transfer system 300, step 210, in which the fuel transfer fitting is inserted into the fuel line, includes mounting the complete stationary module 320 in the vehicle. Further, the conduit recited in step 220 is the second conduit that is part of the portable module 322.

While the foregoing embodiments disclosed the valve stem 384 on the valve member 382 of the female connector, the arrangement may be reversed or altered. Certain advantages, however, are obtained by the shown arrangement:

A male connector as the first transfer connector 334 on the stationary module 320 may be better suited to be accommodated in the space under the fill door 312. A female connector, for the same internal conduit diameter, requires a larger outside diameter than the male connector.

Further, the wider port of the female connector and the valve stem 384 inside the female connector make it easier for a post 140 of a pressure release tool 135 to be inserted for opening the second normally closed valve 376 for discharge of any residual fuel after the fuel transfer has been completed. As best seen in FIG. 9, the pressure release tool 135 is flexibly attached to the second transfer connector 362 or to the second fuel conduit 364 that are part of the portable module 322.

The post 140 of the pressure release tool 135 is long enough to move the valve stem 384 of the second normally closed valve 376 inward and thus to open the second normally closed valve 376. Simultaneously, while the nozzle 70 is adjusted for allowing the valve 142 to open, the handle 125 with the nozzle 70 is held at a lower height than the second transfer connector 362, while the pushbutton 123 is pressed to operate the actuator 120 to open the normally closed valve 142 controlling the flow of fluid through the nozzle 70. Gravity will allow the residual fuel to exit through the nozzle 70, while air entering through the second transfer connector 362 replaces the escaped fuel until the portable module 322 is free of fuel. Because the pressure release tool 135 is only used on the portable module 322, securing the pressure release tool 135 to the portable module 322 eliminates the risk of misplacement of the pressure release tool 135. Use of the pressure relief tool 135 allows fuel to be drained from the portable module 322 for storage.

As mentioned in connection with another embodiment, the fuel transfer system 300 may also include a flow/pressure regulator (not shown) to assist in ensuring that the transfer of fuel does not starve or stall the engine during use. Alternatively, the flow capacity of the system may be dimensioned such that the system inherently provides sufficient restrictions on the fuel flow through conduit 65 without a discrete regulator element. For example, a properly dimensioned orifice may be arranged anywhere in the flow path between the fitting 324 and the nozzle 70. The cross-section of such orifice may be experimentally determined and may depend on the vehicle model.

In yet another variation, the fuel transfer system may be used with an electric component for controlling the vehicle fuel sending unit (fuel pump) independently of the vehicle engine. Such electric component may include a switch controlling electrical power to the fuel sending unit from the vehicle battery. The switch may be controlled remotely and may include a receiver for wireless commands, for example from a wireless key fob. Alternatively, an actuator button may be installed in the vehicle. The actuator button may control the switch fuel sending unit via a wireless connection or a hard-wired connection. Reference is made to U.S. patent application Ser. No. 13/753,199, published as US 2013/0139917 A1, which describes a system and method for operating the fuel sending system without starting the vehicle engine, the disclosure of which is hereby included by reference in its entirety.

Operating the fuel sending unit without starting the vehicle engine has the advantage that no restrictions need to be placed on the flow capacity of the fuel transfer system 300 because no fuel needs to reach the vehicle engine. Thus, the fuel flow through the fuel transfer system 300 may possibly be doubled compared to a system that must also supply fuel to a running engine.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A fuel transfer system for use with a motor vehicle having a fuel-fed engine, a fuel tank and a fuel sending unit for pumping fuel from the fuel tank thorough a fuel line to the engine, the fuel transfer system comprising:
   a stationary module configured for permanent installation in the motor vehicle, the stationary module having,
   a fuel fitting arranged in fluid communication with the fuel line between the fuel sending unit and the engine,
   a first fuel conduit connected to the fuel fitting and providing a fluid path to a first transfer connector attached to the first fuel conduit; the first transfer connector being configured to be secured to the motor vehicle and
   a first normally closed valve in the first transfer connector;
   the fuel transfer system further comprising a portable module, the portable module having,
   a second fuel conduit with a second transfer connector on one of two ends of the second fuel conduit, the second transfer connector adapted for releasable connection with the first transfer connector for establishing a fluid connection between the stationary module and the portable module;
   a second normally closed valve in the second transfer connector;
   a fueling nozzle connected to the other one of the two ends of the second fuel conduit, the fueling nozzle being configured for delivering the fuel flowing from the fuel fitting through the first and second fuel conduits to the auxiliary fuel vessel;
   a third normally closed valve incorporated in the fueling nozzle for controlling delivery of the fuel through the fueling nozzle when the system is operated for delivering fuel to the auxiliary fuel vessel, wherein the portable module includes an electrically conductive material along the second fuel conduit, the conductive material configured for grounding the portable module to the motor vehicle, and a pressure release tool having a flexible attachment portion secured to the second transfer connector and a post secured to the flexible attachment portion, the post having a length dimensioned to temporarily lift a valve member of the second normally closed valve from a valve seat during a draining operation when the second transfer connector is disconnected from the first transfer connector.

2. The fuel transfer system of claim 1, wherein both the first normally closed valve and the second normally closed valve are opened by a mating connection between the first transfer connector and the second transfer connector.

3. The fuel transfer system of claim 1, wherein the first transfer connector has an inside end adjacent the first fuel conduit and an outside end closed by the first normally closed valve, the first normally closed valve including a first valve spring, a first valve seat, and a first valve member, the first valve spring biasing the first valve member toward the outside end of the first transfer connector and toward the first valve seat.

4. The fuel transfer system of claim 3, wherein the second transfer connector has a conduit end adjacent the second fuel conduit and terminal end closed by the second normally closed valve, the second normally closed valve including a second valve spring, a second valve seat, and a second valve member, the second valve spring biasing the second valve member toward the terminal end of the second transfer connector and toward the second valve seat.

5. The fuel transfer system of claim 4, wherein at least one of the first and second normally closed valves has a valve stem abutting the second or first valve member of the other one of the first and second valves when the first and second transfer connectors are in mating engagement, the at least one valve stem having a length that holds the valve members at a distance from each other that forces at least one of the first and second valve members out of contact with the associated first or second valve seat.

6. The fuel transfer system of claim 5, wherein one of the first and second transfer connectors includes an abutment for the associated first or second valve member, the abutment limiting a travel of the associated first or second valve member to a stop position remote from the associated first or second valve seat, wherein the length of the valve stem is dimensioned to both of the first and second valve members out of contact with the respective first and second valve seats when the one of the first and second valve members is in the stop position.

7. The fuel transfer system of claim 6, wherein the second transfer connector includes the abutment and the second valve member includes the valve stem.

8. The fuel transfer system of claim 4, wherein the first valve seat is formed by a first elastic ring inserted into a radial annular groove inside the first transfer connector and retaining the first valve member and the first valve spring inside the first transfer connector.

9. The fuel transfer system of claim 4, wherein the second valve seat is formed by a second elastic ring inserted into a radial annular groove inside the second transfer connector and retaining the second valve member and the second valve spring inside the second transfer connector.

10. The fuel transfer system of claim 4, wherein one of the first and second transfer connectors is a male connector and the other one of the first and second transfer connectors is a female connector, the female connector including a third elastic ring inserted into a radial annular groove inside the female connector and dimensioned to form a seal with the male connector when the first and second transfer connectors are in mating engagement with each other.

11. The fuel transfer system of claim 1, wherein the third normally closed valve is configured to be manually opened.

12. The fuel transfer system of claim 11, wherein the nozzle and the third normally closed valve are incorporated in a handle with an actuator, the actuator being operable to open the third normally closed valve.

13. The fuel transfer system of claim 12, wherein the actuator is operated by a pushbutton.

14. The fuel transfer system of claim 1, wherein the first transfer connector is configured to extend through and to be secured to a hole in a panel or bracket.

15. A method of operating a fuel transfer system with a motor vehicle having a fuel-fed engine, a fuel tank and a fuel sending unit for pumping fuel from the fuel tank thorough a fuel line to the engine, the method comprising the steps of:

installing a stationary module in the motor vehicle, the stationary module having a fuel fitting arranged in fluid communication with the fuel line between the fuel sending unit and the engine, a fluid path to a first transfer connector;

connecting a second transfer connector of a portable module to the first transfer connector, the portable module having a fuel conduit with a second transfer connector on one of two ends of the fuel conduit, the second transfer connector adapted for releasable connection with the first transfer connector for establishing a fluid connection between the stationary module and the portable module;

a manually operable fueling nozzle connected to the other one of the two ends of the fuel conduit, the fueling nozzle being configured for delivering the fuel flowing from the fuel fitting through the first and second transfer connectors and through the fuel conduit to the auxiliary fuel vessel; and a release tool having a flexible attachment portion and a post having a length dimensioned for temporarily opening the second transfer connector during a draining operation, the post being secured to the second transfer connector via the flexible attachment portion;

activating the fuel sending unit of the vehicle to send fuel through the first and second transfer connectors and the fuel conduit to the nozzle;

transferring the fuel to a container by operating the nozzle;

disconnecting the second transfer connector from the first transfer connector; and manually inserting the post into the second transfer connector while operating the fueling nozzle and while elevating the second transfer connector above the fuel conduct and above the nozzle to perform the draining operation by gravity.

16. The method of claim 15, wherein the fuel sending unit is powered independently of the fuel-fed engine.

* * * * *